United States Patent [19]

Yanusko

[11] Patent Number: 5,074,162
[45] Date of Patent: Dec. 24, 1991

[54] LOCAL STATION CLUTCH
[75] Inventor: David Yanusko, Pottstown, Pa.
[73] Assignee: Teleflex Incorporated, Limerick, Pa.
[21] Appl. No.: 674,505
[22] Filed: Mar. 22, 1991

Related U.S. Application Data

[63] Continuation-in-part of Ser. No. 493,713, Mar. 14, 1990, abandoned.

[51] Int. Cl.⁵ .......................... F16C 1/12; G05G 11/00
[52] U.S. Cl. ................................ 74/501.6; 74/89.2; 74/496; 74/480 B; 114/144 R; 192/67 P
[58] Field of Search ............... 74/89.2, 89.21, 496, 74/500.5, 501.6, 505, 506, 480 B; 114/144 R; 192/67 P

[56] References Cited

U.S. PATENT DOCUMENTS

| | | | |
|---|---|---|---|
| 1,914,566 | 6/1933 | Haseltine | 74/505 X |
| 3,206,998 | 9/1965 | Matz, Jr. et al. | 74/480 B X |
| 3,208,300 | 9/1965 | Morse | 74/480 B X |
| 3,766,801 | 10/1973 | Wiegand | 74/496 X |
| 3,796,292 | 3/1974 | Harrison | 74/496 X |
| 4,004,537 | 1/1977 | Nilsson | 114/144 R |
| 4,085,629 | 4/1978 | Fogarollo | 74/506 X |
| 4,211,122 | 7/1980 | Hess et al. | 74/500.5 X |
| 4,449,420 | 5/1984 | Baba | 74/89.2 X |
| 4,872,365 | 10/1989 | Wolf | 74/500.5 X |
| 4,928,547 | 5/1990 | Huyer | 74/501.6 X |

FOREIGN PATENT DOCUMENTS 842221 7/1960 United Kingdom ............... 74/89.21

Primary Examiner—Allan D. Herrmann
Assistant Examiner—Julie Krolikowski
Attorney, Agent, or Firm—Reising, Ethington, Barnard, Perry & Milton

[57] ABSTRACT

A motion transmitting remote control assembly (10) is of the type for transmitting forces in curved path by a flexible motion transmitting core element (18). The assembly (10) comprises a first actuator (12) and a second actuator (14). The first actuator (12) is disposed adjacent the output (35) and comprises a first drive member (24), a first handle (32) and a clutch (36) all coaxial about the first input shaft (30). The clutch (36) comprises a pin (38) which coacts with two slots (37) in the first drive member (24). A spring (42) biases the pin (38) into the two slots (37) so the pin (38) will engage the two slots (37) when they are aligned.

21 Claims, 3 Drawing Sheets

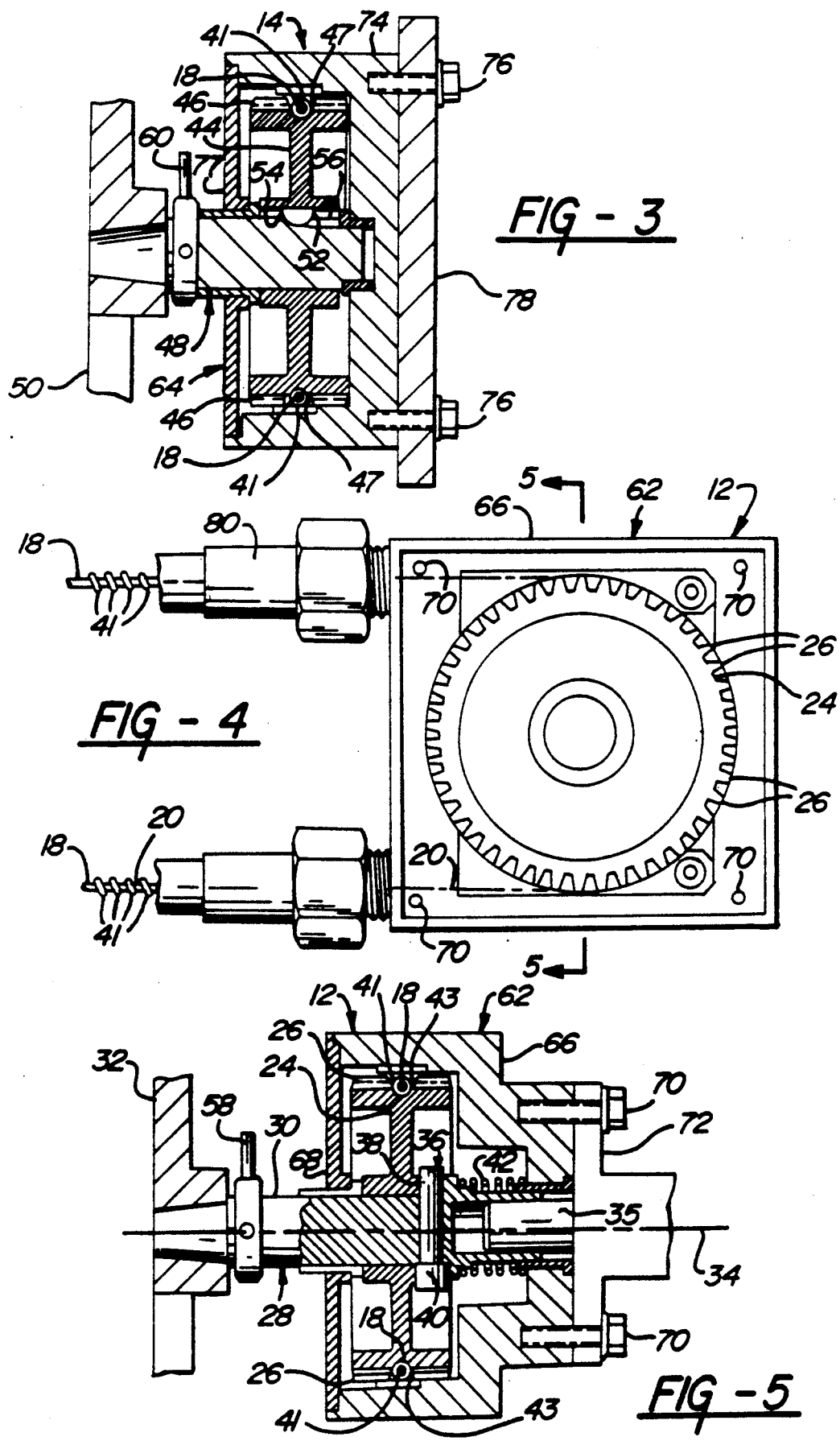

LOCAL STATION CLUTCH

This is a continuation-in-part of copending application Ser. No. 0/493,713 filed on Mar. 14, 1990, now abandoned.

BACKGROUND ART

1. Technical Field

The subject invention relates to remote actuator assemblies having a flexible core element conduit. More particularly, the subject invention relates to clutch mechanism used to disengage the remote actuator.

2. Description of Related Art

Remote actuators are used to change the position of an output device, e.g. a throttle, from a location removed from the output device. Flexible cables are often used to transmit the change in position of the remote actuator from the remote actuator to the output device. Remote actuators are typically found on vehicles and large pieces of machinery. One such remote actuator is disclosed in U.S. Pat. No. 3,206,998, issued to Matz, Jr. et al on Sept. 21, 1965 wherein the remote actuator is the steering wheel of an outboard motor. The local actuator is the engine mount and the output device is the motor/propellor. If the steering wheel were to become inoperable, the operator would have to disconnect the flexible cable at the engine mount and use the engine mount to steer the boat. This becomes cumbersome wherein the operator would need a set of tools handy and must take steps not to lose any parts while boating.

U.S. Pat. No. 3,208,300 issued to Morse on Sept. 28, 1965, discloses an invention which attempts to alleviate the messy problem of disconnecting the steering wheel from the engine mount of a boat. The steering wheel is connected to a pinion which transforms the rotational movement of the steering wheel into the linear movement of the flexible cable conduit via a moveable, pivotal rack. With this design, the operator need only to pivot the rack up and away from the pinon and the operator will be able to steer the boat from the engine mount.

This design, however, also has its disadvantages. First, the operator must disconnect the remote actuator, i.e. the steering wheel, by going to the remote actuator and disconnecting it. In certain applications, this is not desirable because the remote actuator will be distantly located or may be inaccessible by the operator of the local actuator. Much time and possibly more personnel are needed to disconnect the remote actuator. Second, this patent does not address the issue of orientation of the remote actuator. It may be necessary in some instances to know, when reconnecting the remote actuator, the actual orientation of the remote actuator to correctly ascertain the position of the output device. Third, none of the prior art discusses the remote actuator's ability to automatically reconnect itself in a manner as to properly display the correct orientation of the output device.

SUMMARY OF THE INVENTION AND ADVANTAGES

The subject invention relates to a motion transmitting remote control assembly of the type for transmitting forces in a curved path by a flexible motion transmitting core element. This assembly comprises a flexible core element having a first and second ends. Adjacent to and engagable with the first end of the flexible core element is the first actuator. The first actuator includes a drive member which is engagable with the flexible core element. The drive member is used to move and to be moved by the flexible core element. The first actuator further includes an input mechanism for moving the drive member and the flexible core element. The motion transmitting remote control assembly also includes a second actuator which is engagable with and adjacent to the second end of the flexible core element. The subject invention is characterized by a clutch which is disposed adjacent the input mechanism and the drive member. The clutch disengages the drive member and the flexible core element from the input mechanism. This allows the input mechanism to move without moving the drive member or the flexible core element.

The subject invention's primary advantage is it allows the operation of a first actuator when the second actuator is damaged and/or immoveable. The operation of the first actuator may be done without having to go to the second actuator to disconnect it. In addition, the first actuator may be operated if the flexible conduit is, for some reason immoveable. Another advantage of the subject invention allows the second actuator to automatically reconnect itself in its proper orientation after it is desired to reconnect the second actuator.

FIGURES IN THE DRAWINGS

Other advantages of the present invention will be readily appreciated as the same becomes better understood by reference to the following detailed description when considered in connection with the accompanying drawings wherein:

FIG. 3 is a cross-sectional view of the second actuator taken along line 3—3;

FIG. 4 is a plan view of the first actuator with the wheel and cover removed;

FIG. 5 is a cross-sectional view of the first actuator taken along line 5—5 of FIG. 4.

DETAILED DESCRIPTION OF THE DRAWINGS

Figure 1:
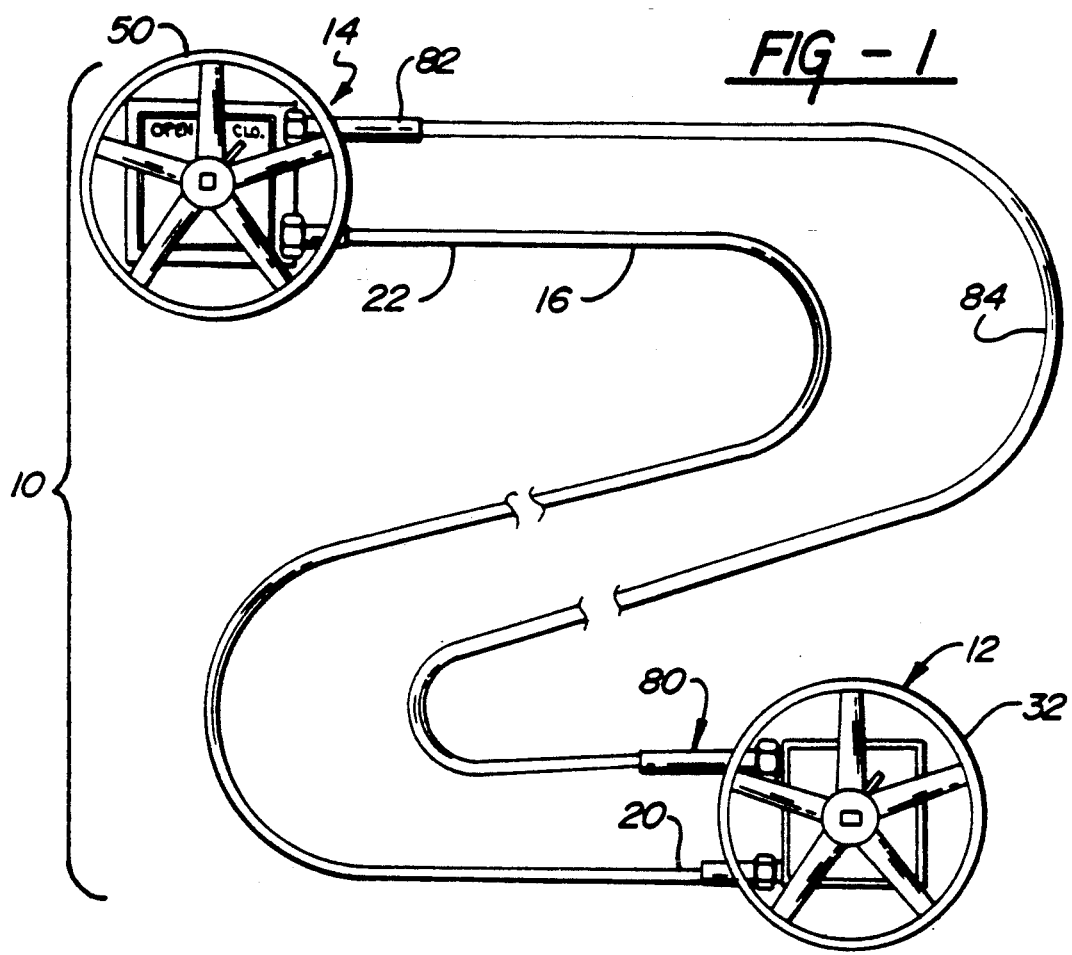
FIG. 1 is a plan view of the subject invention with a portion of the flexible conduit cut away.

The subject invention is generally shown at 10 in FIG. 1. The subject invention is a motion transmitting remote control assembly 10. The subject invention 10 comprises a first actuator 12 and a second actuator 14 connected together via flexible conduit 16. The flexible conduit 16 houses a flexible core element 18, as may be seen in FIGS. 2 and 4. The subject invention 10 is designed to allow the operation of an output device from two or more locations. It will be appreciated that more than two actuators, or stations, may be used when necessary. Only two actuators, however, will be described hereinafter to simplify the explanation of the subject invention 10.

The flexible core element 18 is covered by a flexible conduit 16 between the first actuator means 12 and the second actuator means 14. The flexible core element 18 has first 20 and second 22 ends. FIG. 1 shows numerals 20, 22 pointing to the ends of the flexible conduit 1 for convenience.

The subject invention 10 further comprises second actuator means 14 which is engagable with said flexible core element 18 adjacent said second end 22. The second actuator means 14 is used for being moved by and for moving said flexible core element 18. A more complete description of the second actuator means 14 will be discussed subsequently.

The first actuator means 12 includes a first drive member 24. The first drive member 24 is a circular gear with gear teeth 26. The first drive member 24 engages the flexible core element 18. The first drive member 24 is adjacent the first end 20 of the flexible core element 18 and the first drive member 24 is moved by and moves the flexible core element 18. As is shown best in FIG. 4, the flexible core element 18 is physically in contact with no more than one half of the first drive member 24.

The first actuator means 12 further includes first input means 28 for rotating the first drive member 24 and the flexible core element 18. The first input means 28 also rotates the output shaft 35, discussed subsequently, with no lost motion therebetween. The first input means 28 includes a first input shaft 30 which extends through the first drive member 24. The first input means 28 further includes handle means 32 for imparting a torque on the first input shaft 30 to rotate the first input shaft 30. The handle means 32 may comprise any suitable device to enhance the operator's mechanical advantage. In the subject invention 10, the handle means 32 is a wheel 32 rotating about the longitudinal axis 34 of the first input shaft 30.

The first input shaft 30 extends beyond the first drive means 24 and is in slidable telescopically with respect to the output means 35. The first input shaft 30 surrounds a portion of the output means 35. The output means 35 is an output shaft 35 which rotates without lost motion in response to the rotation of the first input shaft 30. The output shaft 35 and the first input shaft 30 may be keyed or splined together or they may have corresponding flat surfaces to eliminate lost motion therebetween. The mechanism used, however, must allow for the relative longitudinal, or telescopic motion between the first input shaft 30 and the output shaft 35. In other words, the first input shaft 30 and the output shaft 35 allow for no rotational motion therebetween even though the first input shaft 30 and the output shaft 35 slide longitudinally or telescopically with respect to each other. The end of the output shaft 35 is connected to a mechanism to be operated by the operator via the subject invention 10, and, more particularly, either of the handles 32, 50. The mechanism may be a valve which will rotate between two positions.

The subject invention 10 is characterized by clutch means 36 disposed adjacent the first input means 28 and the first drive member 24 for disengaging the first drive member 24 and the flexible core element 18 from the first input means 28. The clutch means 36 allows the first input means 28 to rotate the output shaft 35 without rotating the first drive member 24. This is desirable when either the second actuator 14 and/or the flexible core element 18 are inoperable.

The first drive member 24 further includes engagement means 37 for selectively engaging the clutch means 36. The engagement means 37 comprises two slots 37 wherein each of the two slots 37 are on either end of a line representing the diameter of the first input shaft 30. In the preferred embodiment of the subject invention 10, the two slots 37 abut the first input shaft 30.

Figure 6:
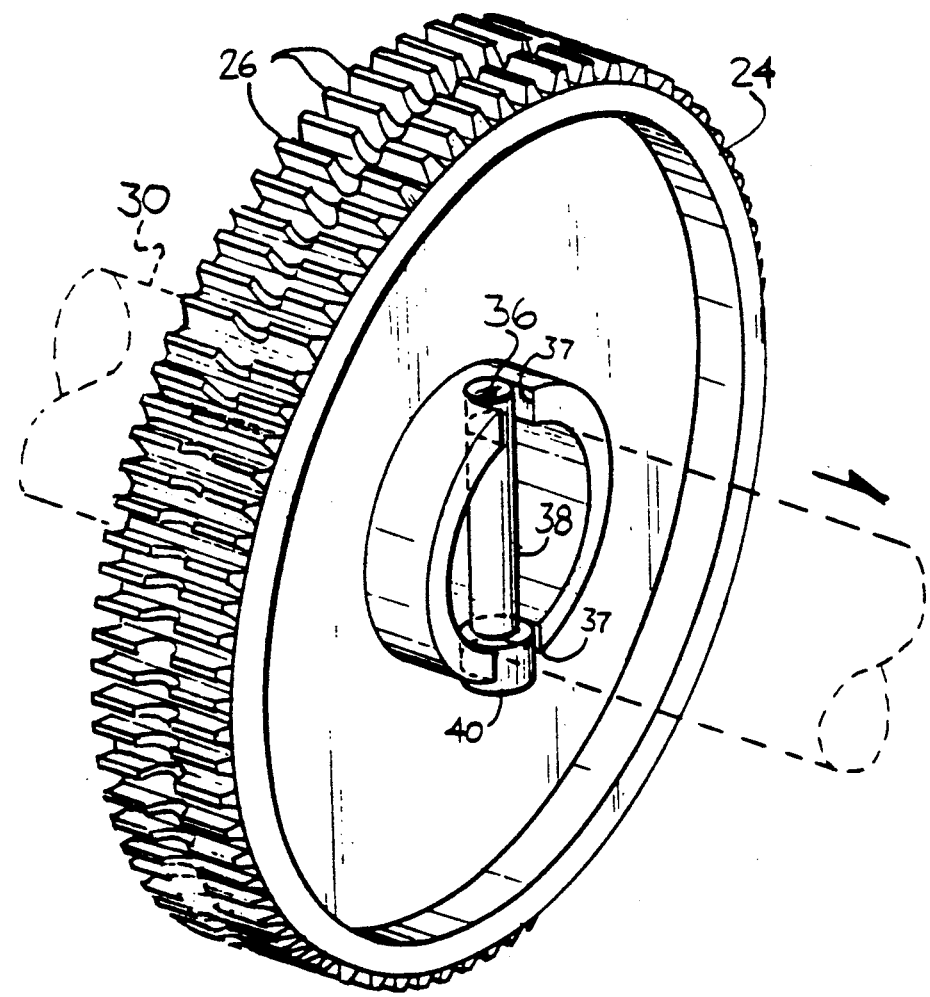
FIG. 6 is a perspective view of the clutch means.

The clutch means 36 is further defined as a pin 38 which is fixedly secured to the first input shaft 30. The pin 38 extends beyond the diameter of the first input shaft 30. In the subject invention 10, the pin 38 extends beyond the first input shaft 30 in both directions, as may be best seen in FIGS. 5 and 6. A cotter pin or similar device may be used to secure the pin 38 in the first input shaft 30. The two ends 40 of the pin 38 extend into the two slots 37 of the first drive member 24. Therefore, when the wheel 32 is turned in any direction, the first input shaft 30 will turn the pin 38. If the pin 38 extends through the two slots 37 of the first drive member 24 the first drive member 24, as well as the output shaft 35, will rotate and the flexible core element 18 will move in direct relation to the rotation of the wheel 32. The pin 38 selectively engages the two slots 37 because the two slots have unequal widths matching the unequal diameters of the two ends 40. This helps insure the second pointer 60 is in the proper orientation with respect to the first pointer 58, discussed subsequently.

The first actuator 12 further includes spring means 42 for spring biasing the pin 38 into and against the first drive member 24. This allows the pin 38 to engage the two slots 37 of the first drive member 24 whenever the two ends 40 of pin 38 are aligned with the two slots 37 and there is an absence of a horizontal force being applied on the wheel 32 by an operator.

The flexible core element comprises a body 18 and a helical wrap 41 fixedly secured thereto. The helical wrap 41 is a wire that wraps around the body 18 in such a manner as to leave space between two adjacent wraps in the same manner as threads of a screw are wound around the shaft of the screw. The helical wrap 41 engages the teeth 26 of the first drive member 24. Thus, the helical wrap 41 of the flexible core element 18 assume the role of a second gear which moves and is moved by the first drive member 24. Each of the gear teeth 26 has a groove 43 in which the flexible core element 18 sits. The grooves 43 restrict the flexible core element 18 from disengaging the gear teeth 26.

Figure 2:
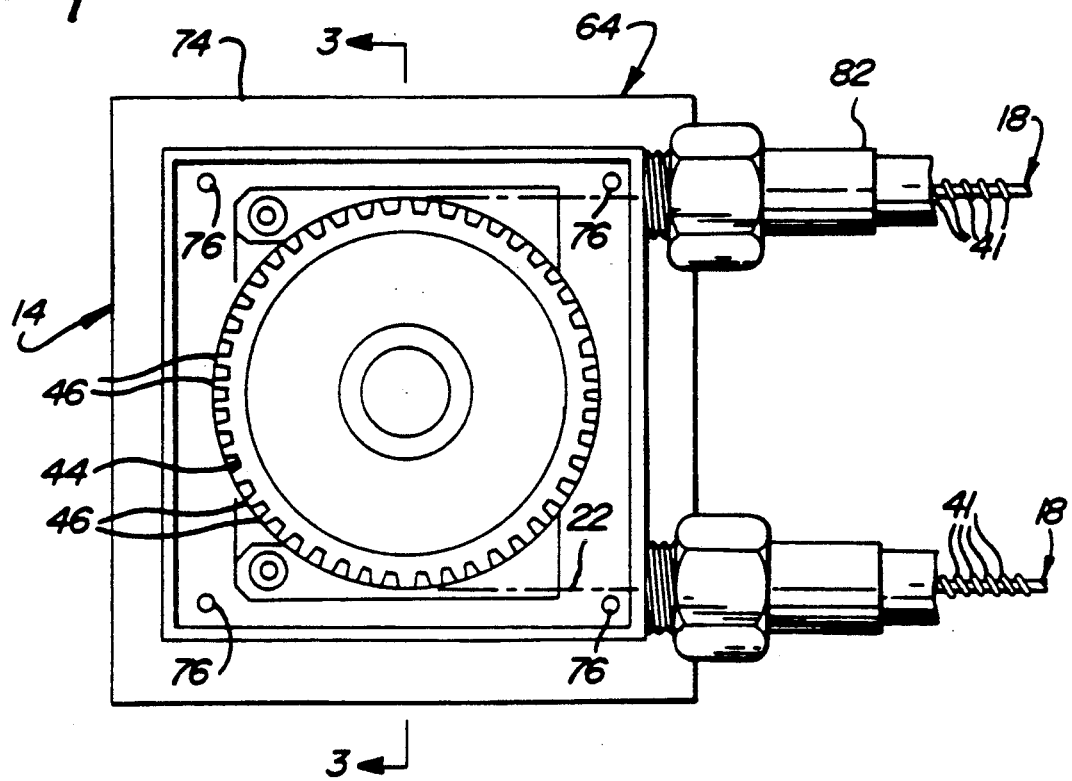
FIG. 2 is a plan view of the second actuator with the wheel and the cover removed.

Returning our attention to the second actuator means 14, a second drive member 44 may be seen in FIGS. 2 and 3. The second drive member 44 is similar to the first drive member 24 in that it comprises a circular gear 44 with gear teeth 46. Each of the gear teeth 46 has a groove 47 similar to the grooves 43 in the gear teeth 26, discussed above. The second end 22 of the flexible core element 18 is wrapped around the second drive member 44 of the second actuator means 14.

The second actuator means 14 further includes a second input means 48 which is fixedly secured and coaxial with the second drive member 44. The second input means 48 moves the second drive member 44 which, in turn, moves the flexible core element 18. The second input means 48 includes second handle means 50 fixedly secured to the second input means 48. The second handle means 50 applies a torque to the second input means 48 to move the second drive means 44 and the flexible core element 18. Absent environmental obstruction, the second handle means 50 may be rotated resulting in two different results depending upon the state of the first actuator means 12. In the first possibility, the movement of the second handle means 50 will move the flexible core element 18 which, in turn, will move the first drive member 24. In the first instance, if the clutch means 36 has engaged the two slots of the first drive member 24, the first drive member 24 will rotate the first input shaft 30 of the first input means 28. This results with the wheel 32 turning in unison with the second handle means 50. In the second instance, the clutch means 36 has not engaged the two slots 37. In this situation, the first drive member 24 will rotate until the two slots 37 align with the pin 38, at which point the clutch means 36 will engage the first drive member 24. Thus, the movement of the second handle means 50 has resulted in the realignment of the second handle means 50 and, at the same time, the second actuator means 14 has re-engaged itself with the first actuator means 12. Now, the second actuator means 14 can move the first input means 28 of the first actuator means 12.

The second drive member 44 includes key means 52 for providing no lost motion between the second handle means 50 and the second input means 48. The key means 52, which includes key 54 attached to the second drive member 44 and a slot 56 in the second input means 48, replaces the clutch means 36 in the first actuator means 12 because there is no need for the second handle means 50 to ever be disengaged from the second drive member 44.

Both the first 12 and second 14 actuator means further include a first 58 and second 60 pointer means. The first 58 and second 60 pointer means are fixedly secured to the first 28 and second 48 input means, respectively, for indicating the orientation of the output means 35.

The first 12 and second 14 actuator means further comprise first 62 and second 64 housing means fixedly secured thereto for protecting the first 12 and second 14 actuator means from adverse environmental conditions in which the subject invention 10 will be placed. The first housing means 62 comprises a metal box 66, cover 68, and fastener means 70. The fastener means 70 may be a set of screws or any other suitable fastener which will secure the first actuator means 12 to a support structure 72. The second housing means 64 comprises a second box 74, a second cover 77 and second fasteners 76. The fasteners 76 or any suitable fasteners, i.e. screws, suitable for securing the second actuator means 14 to a support structure 78. The first housing means 62 further includes a first sleeve 80 for protecting the first end 20 of the flexible core element 18. The flexible core element 18 will extend into the first sleeve means 80 when the first input means 28 is rotated in a counterclockwise fashion. Likewise, the second housing means 64 comprises a second sleeve member 82 fixedly secured to the second box 74 for housing the second end 22 of the flexible core element 18 when the second input means 48 is rotated in a clockwise fashion.

In an alternative embodiment, the first 20 and second 22 ends of the flexible core element are connected via additional flexible core element 84, as shown in FIG. 1. The additional flexible core element 84 enables the first 12 and second 14 actuator means the ability to pull the flexible core element 18 or the additional flexible core element 84 regardless of the direction of the rotation of the first 28 and second 48 input means. In other words, the subject assembly 10 will never have to rely on the compression of the flexible core element 18 to move the output means 35 and will, therefore, be able to utilize a larger force.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10) of the type for transmitting forces in a curved path by a flexible motion transmitting core element said assembly (10) comprising:

a flexible core element having first (20) and second (22) ends;

first actuator means (12) including a first drive member (24) engagable with said flexible core element (18) adjacent said first end (20) for being moved by and for moving said flexible core element (18), said first actuator means further including first input means (28) for moving said first drive member (24) and said flexible core element (18);

second actuator means (14) engagable with said flexible core element (18) adjacent said second end (22) for being moved by and for moving said flexible core element (18), said assembly (10) characterized by clutch means (36) disposed adjacent said first input means (28) and said first drive member (24) for disengaging said first drive member (24) and said flexible core element (18) from said first input means (28) to allow said first input means (28) to move without moving said first drive member (24) and said flexible core element (18).

2. An assembly (10) as set forth in claim 1 further characterized by output means (35) disposed adjacent said first drive member (24) and in slidable contact with said first input means (28) for responding to the rotation of said first input means (28).

3. An assembly (10) as set forth in claim 2 further characterized by engagement means (37) for engaging said clutch means (36) so that said first drive member (24) will rotate with said first input shaft (30).

4. An assembly (10) as set forth in claim 3 further characterized by said engagement means further including two slots (37).

5. An assembly (10) as set forth in claim 4 further characterized by said first input means (28) including a first input shaft (30) extending through said first drive member (24) and surrounding a portion of said output means (35).

6. An assembly (10) as set forth in claim 5 further characterized by said first input means (28) including first handle means (32) for imparting a torque on said first input shaft (30) to rotate said first input shaft (30).

7. An assembly (10) as set forth in claim 6 further characterized by said first handle means (32) including a wheel (32) having a center on axis with said input shaft (30).

8. An assembly (10) as set forth in claim 7 further characterized by said clutch means (36) including a pin (38) fixedly secured to said first input shaft (30) and extending through said slots.

9. An assembly (10) as set forth in claim 8 further characterized by said first (20) and said second (22) ends of said flexible core element (18) being connected by an additional flexible core element (84).

10. An assembly (10) as set forth in claim 9 further characterized by said first actuator having spring means (42) for spring biasing said pin (38) into and against said first drive member (24).

11. An assembly (10) as set forth in claim 10 further characterized by spring means (42) biasing said pin away from said output shaft (35).

12. An assembly (10) as set forth in claim 11 further characterized by first drive member (24) further including a circular gear (24) coaxial with said input shaft (30).

13. An assembly (10) as set forth in claim 12 further characterized by said flexible core element (18) having a helical wire wrapping for engaging said circular gear (24).

14. An assembly (10) as set forth in claim 13 further characterized by said flexible core element (18) physically contacting one half of said circular gear (24).

15. An assembly (10) as set forth in claim 14 further characterized by said second actuator means (14) including a second drive member (44) for moving and for being moved by said flexible core element (18).

16. An assembly (10) as set forth in claim 15 further characterized by said second actuator means (14) further including second input means (46) fixedly secured to and coaxial with said second drive member (44) for moving said second drive member (44) and said flexible core element (18).

17. An assembly (10) as set forth in claim 16 further characterized by said second input means (46) including second handle means (48) fixedly secured to second input means (46) for applying a torque to said second input means (46) to move said drive means (44) and said flexible core element (18).

18. An assembly (10) as set forth in claim 17 further characterized by said second drive member (44) including key means (52) for providing no lost motion between said second drive member (44) and said second input means (46).

19. An assembly (10) as set forth in claim 18 further characterized by first (58) and second (60) pointer means fixedly secured to said first (28) and second (48) input means, respectively, for indicating the orientation of said output means (35).

20. An assembly (10) as set forth in claim 19 further characterized by including first (62) and second (64) housing means fixedly secured to said first (12) and second (14) actuator means, respectively, for protecting said first (12) and second (14) actuator means from adverse environmental conditions in which said assembly (10) will be placed.

21. An assembly (10) as set forth in claim 20 further characterized by first and second sleeves attached to said first and second housing means, respectively, for protecting said flexible core element (18) as said first (20) and second (22) ends wrap around said first (24) and second (44) drive members, respectively.

* * * * *